United States Patent
Wallens et al.

(10) Patent No.: US 8,110,239 B2
(45) Date of Patent: Feb. 7, 2012

(54) QUICK CORN NIXTAMALIZATION PROCESS

(75) Inventors: Celso Olmedo Bejarano Wallens, Battle Creek, MI (US); Joaquín Fernández Baumeister, Fracc. Colinas del Sur México (MX); Roberto Cayetano Guzman Tello, Del Alvaro Obregon (MX); Omar Rangel Alvarez, Estado de Mexico (MX)

(73) Assignee: Sabritas, S. de R.L. de C.V., Col. Bosques de las Lomas (MX)

( * ) Notice: Subject to any disclaimer, the term of this patent is extended or adjusted under 35 U.S.C. 154(b) by 719 days.

(21) Appl. No.: 12/125,769

(22) Filed: May 22, 2008

(65) Prior Publication Data

US 2009/0291186 A1 Nov. 26, 2009

(51) Int. Cl.
*A21D 13/00* (2006.01)

(52) U.S. Cl. ........ 426/560; 426/627; 426/449; 426/504; 426/507; 426/519

(58) Field of Classification Search ............... 426/560, 426/549, 622, 446, 496, 448, 516, 653, 439, 426/458, 627, 449, 504, 507, 519
See application file for complete search history.

(56) References Cited

U.S. PATENT DOCUMENTS

| | | | |
|---|---|---|---|
| 2,584,893 A | 2/1952 | Lloyd et al. | |
| 2,704,257 A | 3/1955 | Diez de Sollano et al. | |
| 3,369,908 A | 2/1968 | Gonzalez et al. | |
| 3,404,986 A | 10/1968 | Wimmer et al. | |
| 3,730,732 A | 5/1973 | Rubio et al. | |
| 3,859,452 A | 1/1975 | Mendoza | |
| 4,423,082 A * | 12/1983 | Bauernfeind et al. | 426/557 |
| 4,513,018 A | 4/1985 | Rubio | |
| 4,594,260 A | 6/1986 | Vaqueiro et al. | |
| 4,623,548 A | 11/1986 | Willard | |
| 4,759,942 A * | 7/1988 | Von Fulger | 426/621 |
| 4,778,690 A | 10/1988 | Sadel, Jr. et al. | |
| 4,808,422 A | 2/1989 | Ward et al. | |
| 4,985,269 A | 1/1991 | Irvin et al. | |

(Continued)

FOREIGN PATENT DOCUMENTS

WO 97/29647 A1 8/1997

(Continued)

OTHER PUBLICATIONS

Twin-screw extrusion of rice four without a die NPL, Manisha Guha, Dec. 1997, http://www.sciencedirect.com/science/article/pii/S0260877497000289.*

*Primary Examiner* — Drew Becker
*Assistant Examiner* — Preston Smith
(74) *Attorney, Agent, or Firm* — Colin P. Cahoon; Celina M. Orr; Carstens & Cahoon, LLP

(57) ABSTRACT

A process for the production of fresh masa, nixtamalized flour and derived products. The invention is a new process for production of corn masa (dough) to be used in the production of tortillas, fried or baked tortilla chips, tostadas, or corn chips. The new process produces masa directly from raw materials without the traditional cooking and steeping steps. It utilizes a series of processing steps including dry blending, hydrating, and working dough in an extruder having a unique screw configuration. The new process uses very little water and emits no waste water.

39 Claims, 1 Drawing Sheet

U.S. PATENT DOCUMENTS

| | | | |
|---|---|---|---|
| 5,158,725 A * | 10/1992 | Handa et al. | 264/40.7 |
| 5,395,637 A | 3/1995 | Reec | |
| 5,401,522 A | 3/1995 | Reeg | |
| 5,532,013 A * | 7/1996 | Martinez-Bustos et al. | 426/496 |
| 5,558,886 A | 9/1996 | Martinez-Bustos et al. | |
| 5,558,898 A | 9/1996 | Sunderland | |
| 5,652,010 A | 7/1997 | Gimmler et al. | |
| 5,662,901 A | 9/1997 | Tobey, Jr. et al. | |
| 6,001,409 A | 12/1999 | Gimmler et al. | |
| 6,025,011 A | 2/2000 | Wilkinson et al. | |
| 6,056,990 A | 5/2000 | Delrue et al. | |
| 6,068,873 A | 5/2000 | Delrue et al. | |
| 6,129,010 A * | 10/2000 | Hurd et al. | 99/353 |
| 6,428,828 B1 | 8/2002 | Jackson et al. | |
| 6,491,959 B1 | 12/2002 | Chiang et al. | |
| 6,638,554 B1 | 10/2003 | Rubio et al. | |
| 7,220,443 B2 | 5/2007 | Rivero-Jimenez et al. | |
| 2002/0022076 A1 | 2/2002 | Lanner et al. | |
| 2002/0168458 A1 * | 11/2002 | Rodriguez et al. | 426/549 |
| 2003/0198725 A1 | 10/2003 | Cardenas et al. | |
| 2005/0214428 A1 | 9/2005 | Gizaw et al. | |
| 2006/0022362 A1 | 2/2006 | Fish et al. | |
| 2006/0177554 A1 * | 8/2006 | Rivero-Jimenez et al. | 426/523 |
| 2006/0177557 A1 | 8/2006 | Rivero-Jimenez | |
| 2007/0092620 A1 | 4/2007 | Zimeri et al. | |

FOREIGN PATENT DOCUMENTS

| | | |
|---|---|---|
| WO | 00/45647 A1 | 8/2000 |
| WO | 01/91562 A2 | 12/2001 |

* cited by examiner

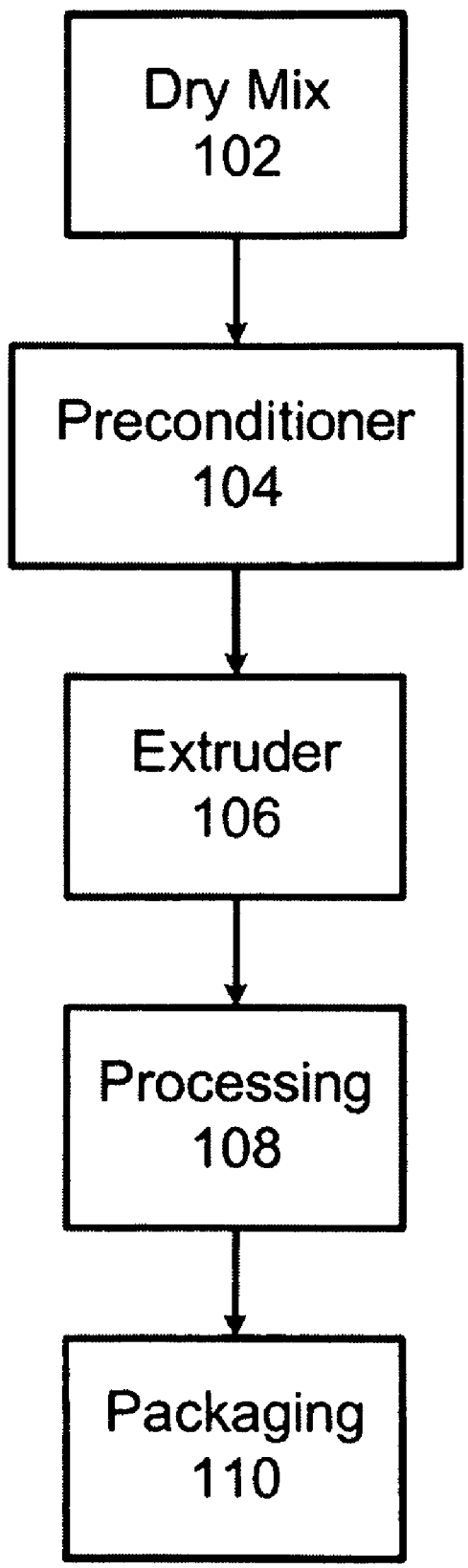

QUICK CORN NIXTAMALIZATION PROCESS

BACKGROUND OF THE INVENTION

1. Technical Field

The present invention refers to an accelerated and environmentally advantageous process for nixtamalization of corn for the preparation of tortillas, tortilla chips, corn chips, and the like. The invention uses specific processing steps to process ground corn fractions and/or ground whole corn as a substitute for the traditional nixtamalization process.

2. Description of Related Art

Corn was the principal source of food for the pre-Columbian civilizations of the New World. Today corn tortillas and derivative products are still the staple food of Mexico and Central America. Also, corn tortilla, corn chips, and tortilla chips have widely penetrated the market of the United States and some countries of Asia and Europe.

Nixtamalization, also known as alkaline cooking, is the traditional process for making corn masa used as the base ingredient for many Mexican-style corn products, such as corn tortillas, tortilla chips, taco shells, tostadas, tamales, and corn chips. It is believed that ancient Central Americans cooked maize in a dispersion of wood ashes or lime to produce corn tortillas, their major form of bread. This ancient technique, having undergone little changes, still involves cooking and steeping whole kernel corn in a solution of lime (calcium hydroxide). Nixtamalization transforms corn so it can be stone ground to form dough called masa that is subsequently sheeted, formed and cut in preparation of tortillas and related snack or food products.

The traditional method to process corn into tortillas (nixtamalization) goes back to early Mesoamerican civilizations, and the basic steps of the process have remained basically unaltered since. In the traditional process, whole corn is cooked in a boiling water-lime (or water-ash) solution for a short time (5-45 min) and steeped in this solution, as it cools, for a period of 12 to 18 hours. The cooking liquor, called nejayote, is discarded; the fraction of the pericarp and germ dissolved in the nejayote is lost. The cooked, steeped, and drained corn grains (nixtamal) are washed to remove excess lime. Here again, a part of pericarp and germ material is lost. The total corn fraction lost varies from 5 to 15%. The highly alkaline (pH 11-12) nejayote, is rich in corn solids and excess lime and is a waste product of both traditional nixtamalization and instant masa flour production. The nixtamal is ground with a pestle and stone into masa. Finally, the masa is flattened into thin disks that are cooked on a hot griddle for 30-60 seconds on each side to produce tortillas. Tortillas prepared by the traditional method just described generally show excellent rheological characteristics, such as puffing and elastic strength.

The major disadvantage of nixtamalization of whole kernel corn is related to alkaline waste and wastewater disposal. The cook steep liquor, nejayote, is an unavoidable by-product of the nixtamalization procedures and is a potential dangerous environmental effluent due to its composition and alkalinity. The proper disposal of the excess wastewater generated during nixtamalization is a major concern during commercial masa production, because wastewater discharge must typically meet specific regulatory requirements. As a result, methods of nixtamalizing corn that reduce effluent production would be both environmental and economically desirable.

Alkaline cooking, steeping and washing of corn also cause partitioning of corn in solids between the masa and the wastewater. Loss of corn solids (i.e., yield loss) during nixtamalization and effluent processing and clean-up costs are considerable. In a commercial operation, corn solids loss has been estimated to vary between 5 and 15% depending on the type of corn. The effluent generated (nejayote) is a potential pollutant because of its composition and characteristics. Nejayote is highly alkaline (pH 11-12), and its solids fraction contains about 75% nonstarch polysaccharides, 11% starch and 1.4% protein and high calcium levels. Nejayote has a chemical oxygen demand (COD) of about 25,000 mg/L, a biological oxygen demand (BOD) of 8,100 mg/L, and a suspended solids content of 20,000 mg/L. In addition to a high BDO and COD, nejayote contains nearly 310 mg of nitrogen and 180 mg of phosphorus per liter. Commercial alkaline corn processing facilities discharge alkaline wastewater in large sedimentation tanks or lagoons for disposal. Some operations dispose of some of the water by irrigating cropland or grass. Sedimentation and microbial degradation of corn solids accomplish wastewater-cleaning operations. Due to alkalinity, wastewater cannot typically be directly discharged into the environment or water streams before proper neutralization.

In large commercial establishments where efforts are focused on expending the nixtamalization process and minimizing steeping times, corn is usually cooked at high temperatures and quenched with water to rapidly reduce corn temperatures. Although this approach shortens process times, it can increase water use and, thus, increase wastewater volumes. A typical corn nixtamalization facility processing 200 tons of corn per day uses more than 50 gal of water per minute and generates nearly the equivalent amount of alkaline wastewater in a 24-hr period.

Research is being done to find effective, economical alternatives to alkaline waste disposal. One approach has been to remove the suspended solids from the wastewater steam by vacuum filtration and then use reverse osmosis to remove dissolved solids. Membranes used in this type of system retain nearly all solids and let only water pass through. However, these membranes are expensive.

In recent years, several processes have been developed for nixtamal, masa, and masa flour production. Many of these processes have been developed to shorten the cooking or steeping process or increase production rates. In one example masa flour production process, the whole grain is partially cooked in a hot alkaline solution to partially gelatinize the starch. The corn is then de-branded, flash-dried, and milled. Several processes use ground corn or corn flour as the starting material and use extrusion or continuous cooking to produce masa or masa flour. These procedures, however, have not completely overcome the waste-generation problems associated with the traditional masa production process. Problems related to product quality, equipment and process costs, and production rates are also sometimes encountered with processes using ground corn material (flour or meal) mixed with lime or using extrusion.

To partially overcome the problem in the quality of masa and tortilla some industrial producers of instant corn flour use gums such as carboxymethyl cellulose, guar, xanthan and Arabic gums to facilitate keeping properties and functionality in tortillas and helping to counteract the effects of lack of pericarp gums due to shorter steeping times during the cooking of corn grains. The flour producers remove the pericarp that affects the color of the products. However, tortilla manufacturers know that rehydrated dry masa flour has different rheological properties compared to fresh masa. Rehydrated dry masa flour is less plastic and cohesive than fresh masa. Also, the products made from dry masa flour stale faster.

Similarly, the quality of the texture and flavor of tortilla made from instant corn flour is lower than that made from fresh masa.

Consequently, a need exists for a process for making masa that eliminates the lye steeping step, eliminates the discharge of caustic and wasteful effluent, shortens processing times, yet produces a masa that is rheologically similar to masa produced by the traditional nixtamalization process. Ideally, such process should be accomplished with minimal material costs and with equipment that is normally available to producers of fresh masa made by the traditional process. In short, the method should be economical, environmentally friendly, and produce an end product that is indistinguishable from the same type of product made by the traditional process.

SUMMARY OF THE INVENTION

The present invention discloses a process for the production of fresh corn masa, by means of a quick nixtamalization process. This process minimizes the crucial steps of the traditional method, so that rheological characteristics and general quality of the traditional tortillas and tortilla chips are retained, but such that no fraction of the corn grain is lost, no polluting effluents are generated, and no steeping times are needed.

Also, with the present invention, corn endosperm gelatinization process is achieved with the minimal water quantity in no more than 30 minutes. The process is completed by a mixing unit operation at high speed which speeds diffusion of water into the internal regions of the grain fractions. Water is added in sufficient quantity to appropriately hydrate and gelatinization of starch, so no water is wasted. The combined action of water, gelatinization agents and temperature produce a cooked milled suitable for the production of fresh masa. By controlling the cooking parameters (mixing time cooking temperature, energy, power, temperature, time, and gelatinization agents content), it is possible to obtain masa suitable for the production of fresh masa and its products.

The quick nixtamalization process offers several advantages over traditional nixtamalization processes for tortilla chip production. The essential step of cooking corn in a solution with an excess amount of lime (calcium hydroxide) is no longer required, which eliminates the production of highly alkaline waste (pH 9-12) streams (nejayote) containing suspended corn solids. Overall, the new process results in higher product yields because it eliminates corn solids losses in the waste streams.

Hard as well as soft corn hybrids of white or yellow dent corn types can be subjected to quick nixtamalization. For traditional nixtamalization, corn processors often prefer to use harder corn types due to reduced corn solids loss and superior flour functionality. Additionally, corn processors require integrity of the corn kernel to minimize losses and increase the process control. The quick nixtamalization process of Applicants' invention can be used with soft corn hybrids without adversely influencing corn solids loss and masa characteristics.

Masa produced using quick nixtamalization usually has a light, acceptable color and a texture similar to masa obtained by traditional method. Food products prepared from quick nixtamalized masa have an appearance, flavor, and texture similar to those prepared from many commercially available nixtamalized corns (masa). Fresh-masa table tortillas typically have subtle flavors and textures rarely duplicated by quick masa flour products. Yet, Applicants' invention can duplicate such results.

Process time using this new nixtamalization procedure has been reduced substantially from 18 hours (average) to, in one embodiment, 15 or 20 minutes. This is very important for corn products manufacturers, because they are able to make changes in their production schedule with almost no production cost impact. Additionally, quality can be controlled better in a lower production cycle time.

Using the traditional nixtamalization process 18 liters of water is required per each kilogram of raw corn to produce fresh masa. About one liter of this is retained in order to produce masa with the proper rheological characteristics suitable for making tortillas. In consequence, 17 liters of water is typically discarded and is a highly dangerous and contaminant effluent (cooking liquor or nejayote and water from washing procedure). Applicants' quick nixtamalization process eliminates all effluents. Considering that water is no easily available natural resource in some countries, the substantial reduction in the use of water with this invention (94%) has a very important ecological impact.

Thus, Applicants' process for making masa eliminates the lye steeping step, eliminates the discharge of caustic and wasteful effluent, shortens processing times, yet produces a masa that is rheologically similar to masa produced by the traditional nixtamalization process. In one embodiment, Applicants' process can be accomplished with minimal material costs and with equipment that is normally available to producers of fresh masa made by the traditional process. Applicants' method is economical, environmentally friendly, and produces an end product that is indistinguishable from the same type of product made by the traditional process.

These and other objectives and advantages of the present invention will be evident to experts in the field from the detailed description of the invention illustrated as follows.

BRIEF DESCRIPTION OF THE DRAWINGS

FIG. 1 is a flow chart showing the processing steps of one embodiment of the present invention.

DETAILED DESCRIPTION

The invention refers to a quick nixtamalization process for the production of fresh corn masa, and their derivatives. With the method of the present invention it is possible to make fresh masa and its derivatives without using the lime solution steeping step.

In general the starting materials used in the process are corn pericarp, tip cap, germ, and endosperm fractions, water, and at least one gelatinization agent. The corn fractions can be of any genotype and should be free of impurities and foreign material. These fractions of pericarp, tip cap, germ, and endosperm can be obtained by milling or decorticating the whole corn grain or by purchasing fractions from the corn dry milling or corn wet milling industries. When using the term corn "fractions" herein, it is intended that such means a specific portion of the corn kernel (such as the pericarp) that has been ground separately from other portions of the corn kernel (such as the endosperm). Thus, Applicants' use of blended corn "fractions" is distinct from prior art practices of using ground corn kernel, or just using the endosperm fractions, when attempting to produce suitable nixtamalized masa.

As previously mentioned, corn solids are lost during the traditional nixtamalization process when the nejayote or generated effluent is discarded. The loss of these solids necessarily changes the ultimate characteristics of the masa that is produced by grinding the remaining corn. Regardless of the process used, therefore, similar masa characteristics cannot be reproduced by simply grinding whole corn to be used as a starting material for a shortened nixtamalization process, as has been suggested by the prior art. Consequently, in order to arrive at an end product having the same flavor and rheological properties as an end product produced by the traditional nixtamalization process, Applicants' invention uses various corn fractions in combination to mimic the composition of the corn that remains after the nejayote is disposed of in the traditional process.

By way of example, the traditional nixtamalization process removes much of the pericarp and some tip cap from the steeped corn kernels. Consequently, grinding corn kernels having the pericarp and tip cap intact and then subjecting it to a shortened nixtamalization process would not emulate the flavor characteristics and rheological properties of the end product when arriving at the dough produced by such procedure. Likewise, using a corn fraction consisting of only endosperm will not emulate traditionally made products, as some of the pericarp, and almost the whole part of the tip cap, and germ does remain after rinsing the nixtamalized kernel. Rather than taking this approach, the instant invention uses a mixture, or blend, of corn fractions in order to reproduce the corn basis for the masa. The precise formulation for these corn fractions is dependent on the type of product to be emulated (for example, a specific formulation is used for each of corn chips, tortilla chips, and corn tortillas). In general, however, the process for production of fresh corn masa or nixtamalized corn flour of the quick invention utilizes by weight percentage a dry mixture of from about 0 to about 10% of peri carp fractions, with a preferred range of between 3 and 7%, and a most preferred amount of about 5%, from about 0 to about 15% germ fractions, with a preferred range of about 8 to about 13%, and a most preferred amount of about 10%, and from about 0 to about 95% endosperm fractions (coarse and fine grits combined), with a preferred range of about 80 to about 95%, and a most preferred amount of about 85.0%. The precise fractions used, as well as the particle size distribution of each fraction, can be adjusted by one skilled in the art in order to obtain the desired rheological properties required for the product to be made from the fresh masa.

In a preferred embodiment, Applicants' invention uses a mixture of fine corn grits, coarse corn grits, and a mixture of hulls (pericarp), germ, and tip-cap (hereinafter "HGT") which is a sub-product obtained from the corn milling process. This HGT component is quite inexpensive, yet is quite useful in Applicants' invention in mimicking a traditionally-produced masa dough.

Fine corn grits comprise an endosperm fraction, where "fine" is generally defined as the fraction of milled corn with a particle size distribution characterized by very small particles, typically on average 150 microns or below. Without limitation, and by way of example only, an example particle size distribution for fine corn grits is shown in Table 1 below.

TABLE 1

Fine Corn Grits Particle Size Distribution

| Mesh | Retention (%) |
| --- | --- |
| Tyler sieve No. 60 | 8.6 |
| Tyler sieve No. 70 | N.A. |
| Tyler sieve No. 80 | 30.9 |
| Tyler sieve No. 100 | 13.9 |
| Bottom | 44.2 |

Table 2 shows a component breakdown by percentage of weight for an example for fine corn grits as well.

TABLE 2

Fine Corn Grits Weight Percent

| Parameter | Min. | Max. |
| --- | --- | --- |
| Moisture, % | 11 | 13 |
| Ashes, % | 0.4 | 0.5 |
| Fat, % | 0.9 | 1.8 |
| Protein, % | 6 | 8.5 |
| Crude fiber, % | 0.8 | 1 |
| Carbohydrates, % | 80.3 | 75.7 |

Coarse corn grits likewise comprise an endosperm fraction, where "coarse" is generally defined as the fraction of milled corn with a particle size distribution characterized by medium particle sizes, typically on average between 250 and 350 microns. Again, by way of example only, and without limitation, Tables 3 and 4 provide an example of the particle size distribution for a coarse corn grit sample and a weight percentage breakdown of the composition of said coarse corn grits.

TABLE 3

Coarse Corn Grits Particle Size Distribution

| Mesh | Retention (%) |
| --- | --- |
| Tyler sieve No. 16 | 0 |
| Tyler sieve No. 20 | 0 |
| Tyler sieve No. 25 | 0.1 |
| Tyler sieve No. 30 | 0.2 |
| Tyler sieve No. 40 | 36.3 |
| Tyler sieve No. 50 | 48.5 |
| Tyler sieve No. 60 | N.A. |
| Tyler sieve No. 70 | N.A. |
| Bottom | 14.9 |

TABLE 4

Coarse Corn Grits Weight Percent

| Parameter | Min. | Max. |
| --- | --- | --- |
| Moisture, % | 11 | 13 |
| Ashes, % | 0.4 | 0.5 |
| Fat, % | 0.9 | 1.8 |
| Protein, % | 6 | 8.5 |
| Crude fiber, % | 0.8 | 1 |
| Carbohydrates, % | 80.3 | 75.7 |

The HGT component of the raw materials used with the invention is a mixture of hulls, germ and tip cap generally obtained as sub product of dry or wet corn milling process. Its composition and relative proportions of each structures (hulls, germ and tip cap), depends on the nature of used corn varieties. An example of a suitable HGT component is corn bran manufactured by MAIZORO S.de R.L.de C.V. of Mexico City. By way of example only, Tables 5 and 6 below provide detail on a sample of an HGT component with regard to particle size and component weight percentages.

TABLE 5

HGT Particle Size Distribution

| Mesh | Retention (%) |
| --- | --- |
| Tyler sieve No. 16 | 68.8 |
| Tyler sieve No. 20 | 8.6 |
| Tyler sieve No. 25 | 3.6 |

TABLE 5-continued

HGT Particle Size Distribution

| Mesh | Retention (%) |
| --- | --- |
| Tyler sieve No. 30 | 2.8 |
| Tyler sieve No. 40 | 3.3 |
| Tyler sieve No. 50 | 2.5 |
| Tyler sieve No. 60 | N.A. |
| Tyler sieve No. 70 | N.A. |
| Bottom | 10.4 |

TABLE 6

HGT Weight Percent

| Parameter | Min. | Max. |
| --- | --- | --- |
| Moisture, % | 8.69 | 8.68 |
| Ashes, % | 3.96 | 4.15 |
| Fat, % | 10.27 | 11.15 |
| Protein, % | 11.1 | 11.71 |
| Crude fiber, % | 6.54 | 5.96 |
| Carbohydrates, % | 59.44 | 58.35 |

Applicants' invention involves the mixing of these corn fractions with one or more gelatinization agents, which will be discussed in further detail below. A typical breakdown by weight percentage of the dry materials used by Applicants with the inventive processes described herein is shown below in Table 7.

TABLE 7

Formulation

| Raw Materials | % |
| --- | --- |
| Coarse corn grits | 50.7 |
| Fine corn grits | 33.5 |
| HGT | 15.2 |
| Gelatinization agents | 0.6 |
| Total | 100.0 |

Thus, in the embodiment disclosed, the endosperm fraction (made up of fine and coarse grits) amounts to about 84.2% by weight of the dry mixture or roughly 85% of the total weight of corn fractions used. The ratio of endosperm fraction with HGT fraction, as well as the ratio of fine to coarse grains within the endosperm fraction, can be adjusted through experimentation by one skilled in the art in order to obtain the desired characteristics of the masa produced. A preferred range for the endosperm fraction is in the range of 83 to 95% by weight of the total of corn fractions, with a most preferred range of about 87% by weight of the total corn fractions. A preferred range for the weight percentage of the hulls, germ, and tip cap fraction is between 5 and 20% of the total corn fractions, with a most preferred range of between about 13 and about 17% of the total corn fractions. The ratio of fine corn grits to coarse corn grits (both being part of the endosperm fraction) can vary considerably. But a preferred range is between 30% to 40% fine corn grits and 60% to 70% coarse corn grits as a weight percentage of the endosperm fraction. The most preferred ratio, as disclosed in Table 7 above, amounts to about 40% by weight fine corn grits and about 60% by weight coarse corn grits as a percentage of the endosperm fraction.

In the preferred embodiment of this process, as will be described below, the hydrolysis, solubilization, hydration, and gelatinization of the corn fractions is achieved by subjecting the endosperm fraction with the addition of proper amounts of the HGT fraction to a rapid cooking at high temperatures. Reduction in steeping time is accomplished with mixing and elevated temperature, which speeds diffusion of water into the internal regions of the grain fractions. As in the traditional process, starch granules are not damaged because, when grains are cooked, they are fully immersed in water, so water availability is not a limiting factor for starch granule swelling. In addition, granule swelling takes place inside the grain matrix, helping to protect them. The inclusion of the pericarp and germ enriches the textures and nutritional quality of the final product. The hydrolysis and solubilization (adding gelatinization agents) of the pericarp releases gums, conferring appropriate texture to the masa with equal characteristics as those produced by the traditional process.

The first unit operation involved in Applicants' invention comprises first mixing all dry ingredients, comprising various corn fractions and one or more gelatinization agents. Referring to FIG. 1, this dry mixing step 102 occurs in a dry material mixer such as a ribbon blender (Polinox) until the dry raw materials are blended into a single admix. These raw materials consist of the corn fractions previously described along with one or more gelatinization agents. The preferred gelatinization agent is calcium hydroxide (CaOH), as the CaOH provides a required flavor component to reproduce the flavor imparted by the traditional nixtamalization process. Calcium oxide (CaO) can also be used. Applicants will refer to CaOH and CaO as "calcium based gelatinization agents." In order to change the gelatinization rate, in alternative embodiments, Applicants can use other gelatinization agents, such as magnesium oxide, in combination with a calcium based gelatinization agent. In any event, the amount of gelatinization agent added to the dry mix during the dry mixing or blending step 102 is preferably 0.35-1.0% or more preferably about 0.55%.

This admix is then thoroughly hydrated by adding water in a preconditioning step 104. This preconditioning step 104, in a preferred embodiment, consists of a high shear mixer with two co-rotating dented spinners. Typical equipment used in the preconditioning step is a Cespite mixer.

Water, preferably hot water, is added during the preconditioning step 104 only in sufficient quantity to appropriately hydrate, gelatinize, and hydrolyze the pericarp, so no water is wasted. In a preferred embodiment, between about 35 liters and about 140 liters of water is used per 100 kg of dry ingredients (corn fractions and gelatinization agents) depending on the ingredients used and the specific process parameters. Using the specific ingredients and process parameters disclosed herein, about 60 liters of water per 100 kg of dry ingredients is preferred. Water is added during the preconditioning step in a preferred embodiment in the range of 50° C. to 80° C. Most preferably the water is about 77° C. when added. The hydrated admix leaves the preconditioning step 104 as a dough at a moisture level of about 45% by weight and a temperature of between about 50° C. and about 59° C. after mixing for between about 2 and 15 seconds.

The hydrated admix, now dough, is then fed into an extruder and subjected to an extrusion step 106, wherein the dough is worked as described below. In a preferred embodiment, the extruder used is a twin screw extruder with three "spacers" (being empty spaces in the screws to increase the residence time in the extruder) and four heating/cooling zones that provide better retention, heat transfer, and fill extruder capacity than prior art single screw extruders.

The preferred twin screw extruder, which has co-rotating and self-sweeping screws, also uses a different screw geometry that can be best described as follows. The twin screws consist of twenty segments so that the dough experiences, in essence, twenty sequential steps as the dough moves from the front or entrance of the extruder, which would be designated as step 1 or segment 1, through the end or exit of the extruder, which will be designated as step 20 or segment 20. In a preferred embodiment, the first step is a transport step. As a consequence, the screw blades located in segment 1 and associated with step 1 are designed to merely transport the dough through that particular step onto step 2. Step 2 is a spacer step, meaning no work either by way of transport or kneading is performed in this segment of the extruder. Segment 2 of the extruder screws has no blades along the shaft or barrel of each screw. As a consequence, the dough is moved through this segment 2 during step 2 by the flow of the dough entering and exiting the step without any assistance from a screw blade in this segment. Step 3 is another transport step and again involves an area where blades along the screw shafts move the dough through the extruder. Step 4 consists of another spacer step where, again, in this segment, there are no blades along the shaft of the extruder screws. Step 5 is a transport step as previously described. Step 6 is a kneading step, which involves segment 6 of the extruder screws having blades that are designed primarily to work the dough or knead the dough as opposed to transporting it through the extruder. This is followed by step 7 involving another transport step or transport configured segment. Step 8 is another spacer step followed by step 9 consisting of a transport step. Step 10, again associated with segment 10 of the extruder screw configuration, is another kneading step. Steps 11 through 19 are all transport steps with the transport screw configuration. The final step 20 is the closing step which involves expelling the dough from the extruder. Thus, it can be seen that Applicants' preferred invention comprises a unique screw configuration having three spacer segments and two kneading segments intermixed with various transport segments in the first eleven segments of the extruder screw configuration. An example of an acceptable twin screw extruder using this preferred embodiment configuration is a KTT 120 by PAVAN-MAPIMPIANTI, Italy. The idea of using spacer segments or steps as a part of this unique screw configuration in essence allows the dough a period to rest while within the extruder, thereby producing the desired rheological properties of the dough. Thus, a preferred embodiment of Applicants' invention uses an extruder having a screw configuration comprising at least one spacer segment.

Table 8 below shows preferred temperature ranges in the various extruder zones using the equipment described above. The temperatures listed are the approximate temperatures of the cooling fluid as it enters the cooling jackets of the above-referenced extruder.

TABLE 8

Extruder Temperature Profile

| Extruder Zone | Temperature Range (° C.) | Preferred Temperature (° C.) |
|---|---|---|
| 1 | 05-35 | 15 |
| 2 | 05-35 | 15 |
| 3 | 05-35 | 15 |
| 4 | 05-35 | 15 |

As can be seen from the table above, the extruder is used to cool the dough during the extrusion step 106. So, the dough is cooled by the extruder as it proceeds through the extruder. Cooling the dough is necessary in order to stop the nixtamalization process that is promoted by the heating. In a preferred embodiment, the dough is heated to a temperature between about 50° C. and about 70° C. during the preconditioning step. In the example provided, the dough is cooled in the extruder, preferably to a range of about 25° C. to about 40° C. and more preferably from about 33° C. to about 37° C. The extruder used in Applicants' process is not equipped with dies at the end of the extruder. As a consequence, the back pressure on the dough is very low to non-existent. Thus, the dough is worked and cooled in the extruder at close to atmospheric pressure, and preferably less than 5 psig. Using the equipment described, the screw speed in the extruder during this step 106 is between about 25 to about 50 rpm, and preferably about 30 rpm. The dwell time for the dough in the extruder described is approximately 1.0 minutes to 5.0 minutes or in a preferred embodiment about 2.5 minutes.

Returning to FIG. 1, when the dough exits the extruder 106, it is now fully processed and cooled fresh masa having rheological properties quite similar to that of masa produced by the traditional nixtamalization process. The process beginning with the preconditioner step 104 to the end of the extruder step typically takes between about 1.0 and about 6.0 minutes and no water is wasted. The moisture level of such masa at this point (exiting the extruder 106) is approximately 45%.

The masa is then used in further processing steps 108 for which masa produced by the traditional nixtamalization steps are applied. For example, these further processing steps 108 might include sheeting, cutting, drying, frying, and seasoning in a manner typical and known in the art for producing tortilla chips. Alternatively, the masa can be further extruded and cooked or processed in any number of different manners known in the art for the production of corn chips, corn tortillas, taco shells, tamales, tortilla chips, and the like.

After processing 108, the final product is typically packaged during a packaging step 110. An example of such packaging step 110 involves placing measured amounts of the end product in flexible film bags using a vertical form, fill, and seal machine.

The present invention involves a method that minimizes the crucial steps of the traditional method, so the rheological characteristics and general quality of the traditional tortillas are retained. Yet, no fraction of the corn grain is lost, no polluting effluents are generated, and no long steeping times are needed, thus saving energy as well. Quick nixtamalization offers a new approach to nixtamalization in which problems with waste generation are virtually eliminated, since substantially all the water added at the hydration step is retained in the masa produced, while still producing a product similar to traditionally lime-cooked masa can be produced.

A successful quick nixtamalization process suitable for processing milled corn fractions to produce fresh masa has been developed. Such masa can be dehydrated by methods know in the food industry to produce masa flour. Applicants' system can be used to produce masa foods and snack products, such as corn tortillas, tortilla chips, corn chips, and taco shells. Masa produced with new technology has characteristics similar to traditional masas. The quick nixtamalization process eliminates the need to cook corn in a lime solution and resultant alkaline waste and wastewater generation. Quick nixtamalization offers an alternative to traditional nixtamalization that can reduce waste generation at its source, use less energy to produce, and minimize investment in expensive waste-treatment systems.

What is claimed is:

1. A method for making fresh corn masa, said method comprising the steps of:
   a) Mixing a calcium based gelatinization agent with an uncooked corn endosperm fraction and with an uncooked corn HGT fraction, thereby forming an admix, and further wherein said HGT fraction is between about 5 and 15% by weight of said total corn fractions in said admix;
   b) Hydrating the admix of step a) with hot water thereby forming a dough, wherein said hot water is between about 50° C. and about 80° C. when added to the admix; and
   c) Feeding the dough of step b) into an extruder having a temperature profile consisting of temperatures between 5° C. to 35° C., wherein said extruder works and cools the dough to range of between about 25° C. to about 40° C. as it proceeds through the extruder, and further wherein said extruder is not equipped with a die, thereby producing masa.

2. The method of claim 1 wherein the hydrating of step b) takes about 1.0 to about 6.0 minutes and wherein further the resultant dough consists of about 45% water by weight at the end of step b).

3. The method of claim 1 wherein the hydrating of step b) comprises adding between about 35 liters and about 140 liters of water per 100 kg of admix.

4. The method of claim 1 wherein said extruder comprises a screw profile having at least one spacer segment.

5. The method of claim 1 wherein said hydrating step b) produces a dough having a temperature of between about 50° C. and about 59° C.

6. The method of claim 1 wherein said extruder comprises at least one cooling zone.

7. The method of claim 1 wherein steps b) through c) are accomplished from between about 1.0 and about 6.0 minutes.

8. The method of claim 1 wherein substantially all the water added at the hydrating of step b) is retained in the masa produced at step c).

9. The method of claim 1 wherein the working of step c) takes place under a pressure of less than 5 psig.

10. The method of claim 1 wherein the calcium based gelatinization agent is CaOH.

11. The method of claim 1 wherein the calcium based gelatinization agent is CaO.

12. A method for making fresh corn masa, said method comprising the steps of:
   a) Mixing a calcium based gelatinization agent with a corn endosperm fraction thereby forming an admix, and further where said endosperm fraction comprises about 30% to about 40% fine corn grits and about 60% to about 70% coarse corn grits by weight;
   b) Hydrating the admix of step a) with hot water thereby forming a dough, wherein said hot water is between about 50° C. and about 80° C. when added to the admix; and
   c) Feeding the dough of step b) into an extruder having a temperature profile consisting of temperatures between 5° C. to 35° C., wherein said extruder works and cools the dough to range of between about 25° C. to about 40° C. as it proceeds through the extruder, and further wherein said extruder is not equipped with a die, thereby producing masa.

13. The method of claim 12 wherein the hydrating of step b) takes about 1.0 to about 6.0 minutes and wherein further the resultant dough consists of about 45% water by weight at the end of step b).

14. The method of claim 12 wherein the hydrating of step b) comprises adding between about 35 liters and about 140 liters of water per 100 kg of admix.

15. The method of claim 12 wherein said extruder comprises a screw configuration having at least one spacer segment.

16. The method of claim 12 wherein said hydrating step b) produces a dough having a temperature of between about 50° C. and about 59° C.

17. The method of claim 12 wherein said extruder comprises at least one cooling zone.

18. The method of claim 12 wherein steps b) through c) are accomplished from between about 1.0 and about 6.0 minutes.

19. The method of claim 12 wherein substantially all the water added at the hydrating of step b) is retained in the masa produced at step c).

20. The method of claim 12 wherein the working of step c) takes place under a pressure of less than 5 psig.

21. The method of claim 12 wherein the calcium based gelatinization agent is CaOH.

22. The method of claim 12 wherein the calcium based gelatinization agent is CaO.

23. A method for making fresh corn masa, said method comprising the steps of:
   a) Mixing a calcium based gelatinization agent with an uncooked corn fraction, thereby forming an admix;
   b) Hydrating the admix of step a) with hot water thereby forming a dough, wherein said hot water is between about 50° C. and about 80° C. when added to the admix; and
   c) Feeding the dough of step b) into an extruder having a temperature profile consisting of temperatures between 5° C. to 35° C., wherein said extruder works and cools the dough to range of between about 25° C. to about 40° C. as it proceeds through the extruder, and wherein further said dough is exposed to at least one spacer step within the extruder, and wherein said extruder is not equipped with a die, thereby producing masa.

24. The method of claim 23 wherein the hydrating of step b) takes about 1.0 to about 6.0 minutes and wherein further the resultant dough consists of about 45% water by weight at the end of step b).

25. The method of claim 23 wherein the hydrating of step b) comprises adding between about 35 liters and about 140 liters of water per 100 kg of admix.

26. The method of claim 23 wherein said hydrating step b) produces a dough having a temperature of between about 50° C. and about 59° C.

27. The method of claim 23 wherein said uncooked corn fraction comprises an endosperm fraction and an HGT fraction, and further wherein said HGT fraction is between about 5 and 15% by weight of said total corn fraction in said admix.

28. The method of claim 23 wherein said extruder comprises at least one cooling zone.

29. The method of claim 23 wherein steps b) through c) are accomplished from between about 1.0 and about 6.0 minutes.

30. The method of claim 23 wherein substantially all the water added at the hydrating of step b) is retained in the masa produced at step c).

31. The method of claim 23 wherein the working of step c) takes place under a pressure of less than 5 psig.

32. The method of claim 23 wherein the calcium based gelatinization agent is CaOH.

33. The method of claim 23 wherein the calcium based gelatinization agent is CaO.

34. The method of claim 23 wherein said dough as it proceeds through the extruder at step c) is exposed sequentially to a transport step, followed by a spacer step, followed by a transport step, followed by a spacer step, followed by a transport step.

35. The method of claim 34 wherein further the dough is exposed after said last transport step to a kneading step, followed by a transport step, followed by a spacer step, followed by a transport step, followed by a kneading step.

36. The method of claim 1 wherein said hydrating step comprises mixing for between about 2 and 15 seconds.

37. The method of claim 12 wherein said hydrating step comprises mixing for between about 2 and 15 seconds.

38. The method of claim 23 wherein said hydrating step comprises mixing for between about 2 and 15 seconds.

39. The method of claim 1 wherein said extruder of step c) comprises three spacer segments and two kneading segments intermixed with transport segments.

* * * * *